May 20, 1958
V. SANTARELLI
2,835,413
GARDEN DUSTER
Filed Oct. 25, 1954
2 Sheets-Sheet 1
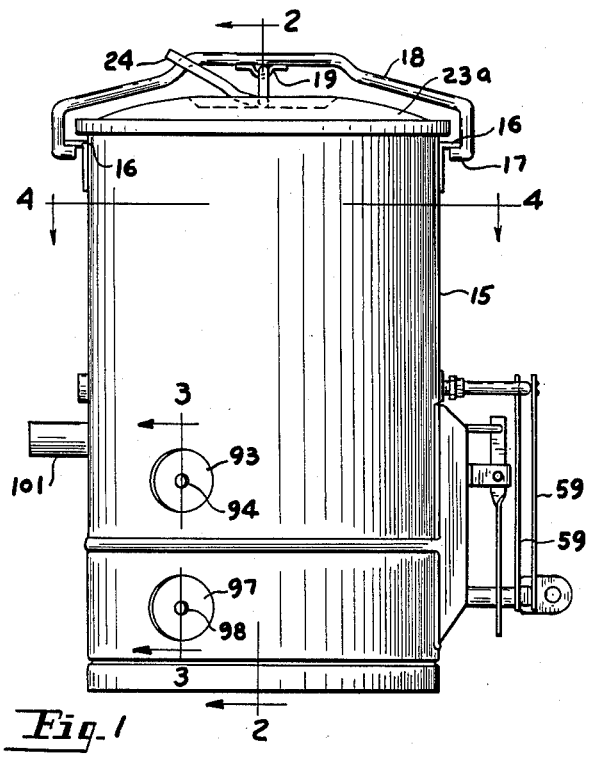
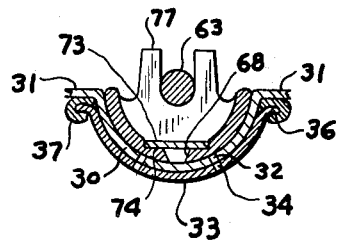
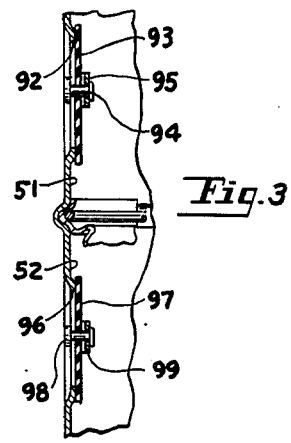
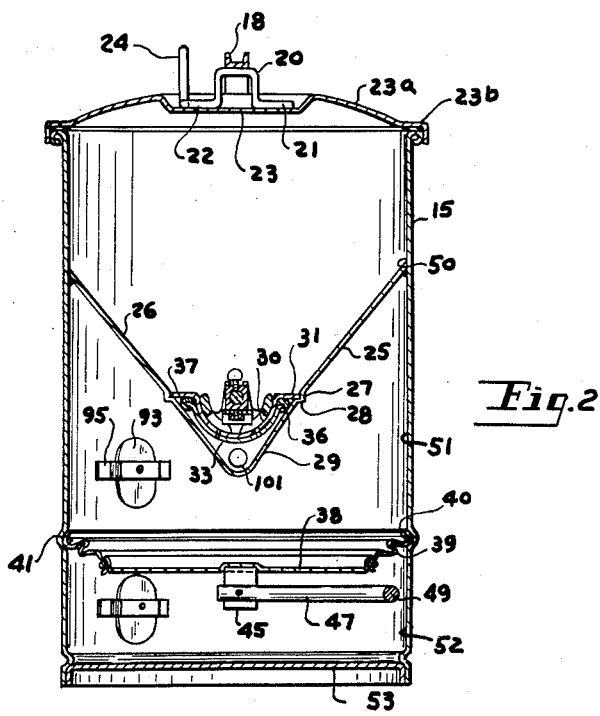
INVENTOR.
VINCENT SANTARELLI,
BY
ATTORNEY.

May 20, 1958 V. SANTARELLI 2,835,413
GARDEN DUSTER
Filed Oct. 25, 1954 2 Sheets-Sheet 2
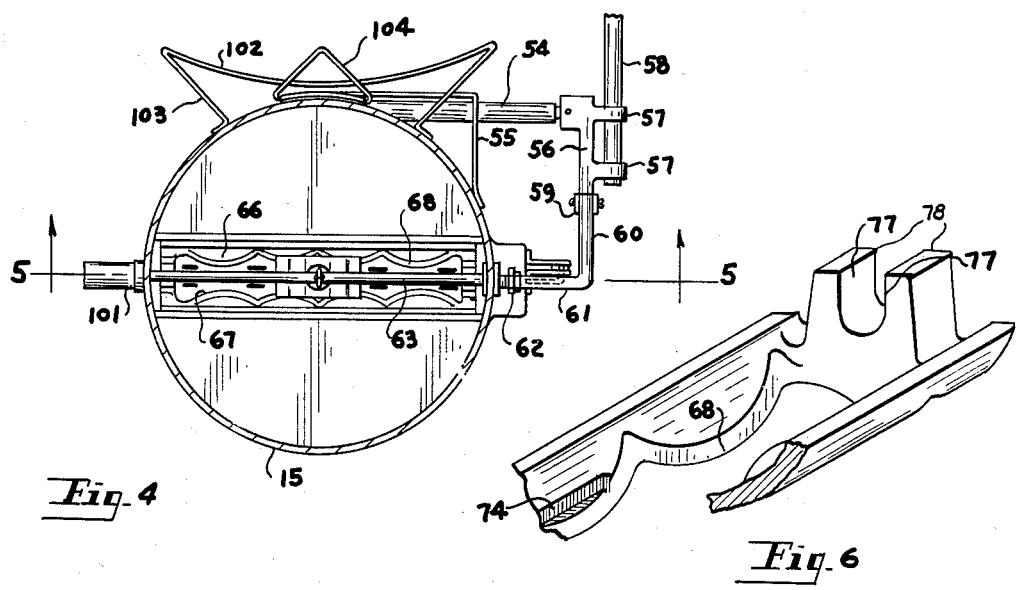
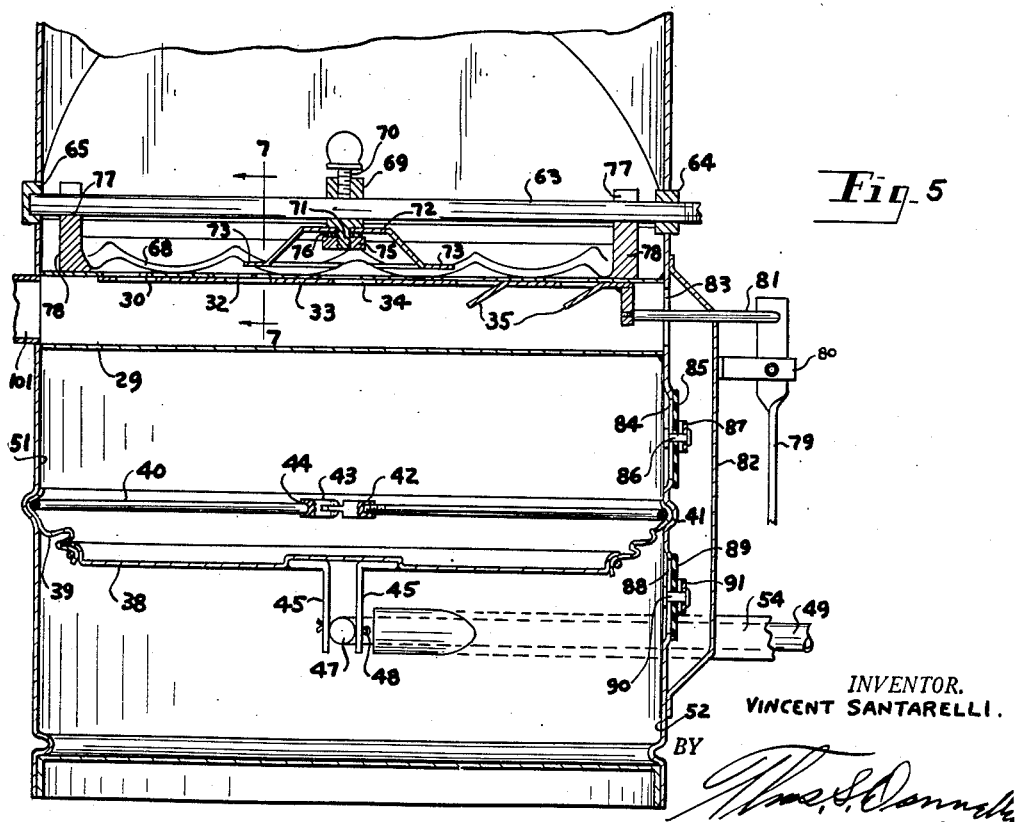
INVENTOR.
VINCENT SANTARELLI.
BY
ATTORNEY.

United States Patent Office 2,835,413
Patented May 20, 1958

2,835,413
GARDEN DUSTER
Vincent Santarelli, Detroit, Mich.
Application October 25, 1954, Serial No. 464,458
7 Claims. (Cl. 222—175)

My invention relates to a new and useful improvement in a garden duster adapted for dusting plants with powder.

It is an object of the present invention to provide a garden duster in which the dust is expelled by air pressure from a nozzle attached to the duster and in which the air pressure may be maintained substantially constant on the dust that is expelled from the nozzle or through the conduit threaded to the nozzle.

Another object of the invention is the provision of a bellows which may be used for forcing air out of a pair of contiguous air containers into which the air may be drawn and from which it may be expelled; the bellows or air moving member forming a separating wall between the containers so that when moved inwardly of one container the air will be expelled therefrom and drawn into the other container using reverse operation when the movement takes place in the opposite direction.

Another object of the invention is the provision in a garden duster of an agitating means for agitating the powder and preventing it from forming into lumps or caking so as to assure the ready passage of the powder into the conduit through which the air is traveling.

Another object of the invention is the provision in a garden duster of this class of an agitating plate so arranged and shaped, that it will serve to effectively agitate the powder to assure its passage into the air passage and serves to cut fine particles from any lumps which may be present in the powder.

Another object of the invention is the provision of a regulator for regulating the amount of powder passing into the air passage and so arranged and constructed that it may be easily and quickly operated.

Another object of the invention is the provision in a garden duster of a regulating plate for regulating the amount of powder passing into the air passage and so arranged and constructed that the passage of air into the powder container is obviated.

Another object of the invention is the provision in a garden duster of this class of an agitator or scraper which may be easily and quickly mounted in position and removed from position and which is so constructed as to afford a clean scraping of the powder at each movement.

Another object of the invention is the provision in a garden duster of this class of a powder receptacle having a cover therefore provided with a nozzle arrangement for securing it on the container in sealing relation thereto.

Another object of the invention is provision of a garden duster of the class described which may be easily and quickly operated and which will be highly efficient in use.

Other objects will appear hereinafter.

It is recognized that various modifications and changes may be made in the detail of structure illustrated without departing from the invention and the present disclosure is intended to be an illustration of but the preferred embodiment.

Forming a part of this specification are drawings in which;

Fig. 1 is a side elevational view of the invention,

Fig. 2 is a longitudinal vertical sectional view taken on line 2—2 of Fig. 1,

Fig. 3 is a fragmentary enlarged sectional view taken on line 3—3 of Fig. 1,

Fig. 4 is a sectional view on line 4—4 of Fig. 1,

Fig. 5 is a fragmentary slightly enlarged sectional view taken on line 5—5 of Fig. 4, Fig. 6 is a fragmentary perspective view of the scraper used in the invention, Fig. 7 is an enlarged sectional view taken on line 7—7 of Fig. 5.

As shown in the drawings the invention comprises a powder container 15 open at its upper end. Mounted on the periphery of this container 15 adjacent to the upper end are the outwardly extending brackets or legs 16 adapted to engage the inturned end 17 of the bail 18. This bail 18 carries on the underside centrally thereof a knuckle 19 in which is pivotally mounted the bight 20 of a U-shaped structure, the legs thereof having the angularly turned portions 21 and 22 which are adapted to engage the inwardly pressed portion 23 of the cover 23a. The angularly turned portion 22 is provided with the angularly turned handle forming a portion 24 which extends at right angles thereto and serves as a means for rocking this structure on the bight 20. When the cover 23a is placed in position and the portions 17 brought into engagement with the legs 16 as shown in Fig. 1, the handle 24 may be moved downwardly toward the cover so that the members 21 and 22 function as cams to place the cover into close engagement with the sealing gasket 23b which bears upon the edge of the open end of the container 15.

This container 15 serves as a receptacle for the powder which it is desired to dust upon the plants. This receptacle has a bottom formed preferably from a single sheet of metal and provided at opposite sides of its diameter with the inclined portions 25 and 26. These inclined portions 25 and 26 terminate in the axially directed portions 27 and the diametrically extending portion 28 to provide a table or shoulder. Below this table or shoulder, this part is formed into the trough 29 which serves as an air passage and into which the powder will pass in the form of fine dust.

Resting at its opposite edges on the table 28 and suitably secured thereto are the side flanges 31 on opposite sides of the arcuate plate 30. This plate 30 in reality serves as the central bottom portion of the receptacle in which the powder is disposed. Formed in this plate 30 is a plurality of spaced apart slots 32. Slidably mounted below the plate 30 and in engagement with the under surface thereof is an arcuate regulating plate 33 having slots 34 formed therein adapted to move into registration and out of registration with the slots 32 formed in the plate 30. Extending outwardly from the edges of the plate 33 on opposite sides are the flanges 36 which slide in the guides 37 projecting inwardly from the inner face of the trough 29 at the top thereof. It will be noted that adjacent one end of the plate 33 inclined tongues 35 project downwardly from one end of the slots 34. These slots 34 are formed by punching the metal out of the plate 33 but in the form of the slots adjacent said one end of the plate 33 the metal is severed only at one side of the slots to provide the tongues 35.

Below the bottom of the receptacle or chamber 50 is an air receiving chamber 51 operated from the air receiving chamber 52 which is closed at one end by the closure 53, by means of an air moving structure embodying a rigid plate 38 and flexible bellows forming ring 39. The edge of the flexible ring or sleeve 39 is retained in position by the wire ring 40 sitting in the internal groove 41. This wire 40 is provided at one end with a connector 42 threaded to which is the expander 43 having a socket 44 formed in one end in which the opposite end of the wire 40 engages. The construction is such that when the wire is seated in the groove 41 so as to press the sleeve 39 thereto a threading of the members 42 and 43 relatively to each other will expand the ring 40 after its end has been matched in the socket 44 thus affording an easy and quick method of fastening the fabric sleeve 39 in position. Secured to the plate 38 and projecting downwardly therefrom is a pair of spaced apart arms 45 between which projects the angularly turned handle 47 of a rod 49. This angularly turned end is connected to the arms 45 by means of the cotter pin 48. This rod 49 extends through the sleeve 54 which opens into the interior of the chamber 52 and which projects through the bracket 55. Secured fixedly to the end of the rod 49 is a fitting 56 having a pair of knuckles 57 formed thereon in which engages an operating handle 58. The end of the fitting 56 is connected by the bars 59 to a crank 60 which constitutes an angularly turned portion on the rod 61. This rod 61 is connected by the coupling 62 to the rod 63 which extends diametrically of the chamber 50 and which is journaled in the bearings 64 and 65 mounted on the receptacle 15.

An agitator or scraper 66 extends diametrically of the chamber 50 and is shaped on its lower surface to conform to the upper surface of the plate 30 on which it rests. This scraper or agitator is provided with slot 67 extending substantially from end to end. This slot is wider at some portion than others. The scraper 66 at the edges of the slot 67 is formed with the beveled edge or face 68 so that as this scraper or agitator 66 is rocked the beveled edges 68 will serve to cut any lumps or hard particles which may be present in the powder disposed in the chamber 50 so that it may freely pass through the slots 32 formed in the plate 30. Moreover this scraper or agitator will prevent any accumulation of the powder on the upper face of the plate 30 while at the same time it will agitate the powder portion above it to assure a constant flow downwardly.

Mounted on the rod 63 is a block 69 in which is threaded a set screw 70 by which the block 69 may be secured in fixed relation to the rod 63 so that when the rod 63 rocks on its axis the block 69 will rock with it. Projecting downwardly from the block 69 is a threaded stud 71 which also projects through a resilient chair 72 which may be defined as a U-shaped structure having the outwardly turned portions 73 on its opposite legs. These portions 73 are adapted to sit in a recess 74 formed in the scraper or agitator 66. A nut 75 and a washer 76 are positioned on the stud for securing the chair in position thereof. When the set screw 70 is tightened the scraper plate or agitator 66 will rock in unison with the rocking of the rod 63, this rod 63 resting in the recesses 77 formed in the end walls 78 of the scraper.

A rocking of this rod 63 is effected upon moving the handle 58 upwardly or downwardly as the rocking motion is thus transmitted from the fitting 56 through the bars 59 to the crank 60. Thus a flow of the powder through the slots 32 and 34 into the trough is assured so long as there is powder in the chamber 50.

The regulating slide 33 may be moved longitudinally of the plate 30 so as to move the slots 34 into and out of registration with the slots 32 and thus regulating the size of the openings through which the powder may flow through the trough 29. This slidable movement of the regulating slide 33 is effected by handle 79 which is pivoted to the bracket 80 and which is pivotally connected to one end of the rod 81 the other end of which is connected to the plate or slide 33. The handle 79 is manually rocked in either direction.

Mounted on the side of the receptacle 15 is a manifold or housing 82 communicating with the interior of which, at the upper end thereof, through the opening 83 is the interior of the trough 29. This housing is adapted also to communicate with the interior of the compartment 51 through the opening 84. This opening 84 is also closed by the flap valve or disc 85 which is formed from rubber, leather or other suitable material. Projected through this disc 85 is the pin 86 which also slidably projects through the bracket 87. The construction is such that pressure from the inside of the compartment 51 will move the valve disc 85 to non-closing position and permit the passage of air through the opening 84 into the interior of the housing 82. The compartment 52 is adapted to communicate through the opening 88 with the interior of the housing 82. This opening is similarly opened and closed by a flap valve or disc 89 through which is projected a pin 90 which is slidably projected through the bracket 91. The arrangement is such that pressure from the inside will move the valve disc 89 off of its seat and permit air to escape into the housing 82.

I have shown in Fig. 3 the compartment 51 adapted to communicate with the atmosphere or exterior through the opening 92. This opening 92 may be controlled by the flap valve or disc 93 through which is projected a pin 94, which slidably projects through the bracket 95. The compartment 52 is adapted to communicate with the exterior or atmosphere through the opening 96 which is controlled by the flap valve or disc 97 for carrying the pin 98 slidably projecting through the bracket 99.

The construction is such that when powder is disposed in the chamber 50 and the handle 58 is manually rocked upwardly the rod 49 will rock on its axis so that the crank 47 will be moved upwardly and downwardly. As shown in Fig. 5 when the rod 49 is rocked so that the crank 47 moves upwardly the air will be expanded from the compartment 51 through the opening 84 into the housing 82 from which it will pass through the opening 83 into the trough and outwardly into the pipe 101 which communicates with the interior of the trough. Secured to the pipe or conduit 101 would be a flexible hose carrying a suitable control nozzle constructed and operated in a manner well known. As the crank 47 moves upwardly to expell the air from the compartment 51 the valve 93 will be forced onto its seat so that the air cannot escape through the opening 92. At the same time the valve 89 controlling the opening 88 leading into the compartment 52 will be closed while the valve 97 shown in Fig. 3 will be moved to open position to allow air to enter through the opening 96 into the compartment 52. In the reverse movement, when the crank 47 is rocked downwardly, the air will be drawn into the compartment 51 and the air in the compartment 52 will be forced outwardly into the housing 82. This air passing through the trough 29 will be of sufficient velocity to blow the powder or dust out of the dusting nozzle with the proper speed for efficient operation. By this method there is provided a means whereby a steady stream of the dust will be effected as the dual compartment arrangement assures a constant flow of air under pressure inwardly through the opening 83 at the same time that this mechanism, which presses the air in one compartment under pressure and draws air into the other compartment, is operating, the scraper plate 66 will of course be rocked back and forth. The tongues 35 are at the entry end of the air passage so that air coming into the opening 83 is deflected from the slots 32 and 34 which are adjacent the entry end. This prevents the air under pressure from blowing upwardly through these slots into the chamber 50.

In the use of such a garden duster it is quite common for the operator to carry the receptacle on his back. Secured on one side of the receptacle 15 is a curved plate 102 which has the legs 103 to retain this plate spaced outwardly from the receptacle 15. The plate 102 is curved to more comfortably fit the back of the user. A pivoted hook 104 is mounted adjacent the bottom of the receptacle 15 to serve as a means for securing an attaching belt or the like thereto so that the structure may be easily and quickly secured in position on the back of the user.

Experience has shown that a duster constructed in the manner described will afford the advantages enummerated herein while at the same time an efficiently operating garden duster is provided.

What I claim is:

1. A garden duster of the class described comprising: a chamber for storing a dusting powder; means for feeding the powder at a steady predetermined rate from said chamber; a discharge passage for receiving the powder from said feeding means; a first air chamber; a second air chamber disposed adjacent said first air chamber; a conduit connecting said air chambers to said discharge passage; and a bellows forming a separating wall between said chambers, said bellows being operable whereby when it is moved inwardly of one chamber, air will be expelled therefrom and into said conduit and drawn into the other chamber whereby a steady flow of air is provided to discharge powder for dusting plants.

2. A garden duster of the class described comprising: a chamber for storing a dusting powder; means for feeding the powder at a steady predetermined rate from said chamber; a discharge passage for receiving the powder from said feeding means; a first air chamber; a second air chamber disposed adjacent said first air chamber; a conduit connecting said air chambers to said discharge passage, said chambers being provided with an air inlet valve and with a discharge valve for discharging the air from each chamber into said conduit; and a bellows forming a separating wall between said chambers; said bellows being operable whereby when it is moved inwardly of one chamber air will be expelled therefrom and into said conduit and drawn into the other chamber whereby a steady flow of air is provided to discharge powder for dusting plants.

3. A garden duster of the class described comprising: a chamber for storing a dusting powder; means for feeding the powder at a steady predetermined rate from said chamber; a discharge passage for receiving the powder from said feeding means; a first air chamber; a second air chamber disposed adjacent said first air chamber; a conduit connecting said air chambers to said discharge passage, said chambers being provided with an air inlet valve and with a discharge valve for discharging the air from each chamber into said conduit; a bellows forming a separating wall between said chambers; and means for operating said bellows by hand operation whereby when it is moved inwardly of one chamber, air will be expelled therefrom and into said conduit and drawn into the other chamber whereby a steady flow of air is provided to discharge powder for dusting plants.

4. A garden duster of the class described comprising: a container having a closed lower end and an open upper end; a cover releasably mounted on the open upper end; the upper portion of said container adapted to form a dusting powder storage chamber; a perforated plate in the bottom wall of said chamber for feeding the powder therefrom at a steady predetermined rate; a regulating means slidably mounted on the lower side of said perforated plate for adjusting the rate of powder flow; an agitating means rockably mounted in said storage chamber adapted to coact with said perforated plate for agitating the dusting powder to prevent it from forming into lumps; a discharge passage in said container immediately below said perforated plate for receiving the dusting powder; an air chamber in said container below said discharge passage; a bellows in said air chamber adapted to form a separating wall in said air chamber and divide it into two portions; a conduit connecting said air chamber portions with said discharge passage; each of said air chamber portions being provided with an air inlet valve and a discharge valve for discharging the air from each air chamber into said conduit; and means adapted for manual operation of said agitating means and said bellows, whereby, a steady flow of powder and air is supplied to said discharge passage.

5. A garden duster of the class described comprising: a container having a closed lower end and an open upper end; a cover releasably mounted on the open upper end; the upper portion of said container adapted to form a dusting powder storage chamber; the lower end of said storage chamber including a pair of downwardly and inwardly sloping walls; the lower ends of said walls being spaced apart and interconnected by a concavely shaped transverse plate; a plurality of apertures through said plate; a guide means disposed beneath said transverse plate; a regulating means slidably mounted on said guide means and adapted to coact with said transverse plate for regulating the rate of powder flow; an agitating means rockably mounted in said storage chamber adapted to coact with said transverse plate for agitating the dusting powder to prevent it from forming into lumps; a discharge passage in said container immediately below said transverse plate for receiving the dusting powder; an air chamber in said container below said discharge passage; a bellows in said air chamber adapted to form a separating wall in said air chamber and divide it into two portions; a conduit connecting said air chamber and divide it into two portions; a conduit connecting said air chamber portions with said discharge passage; each of said air chamber portions being provided with an air inlet valve and a discharge valve for discharging the air from each air chamber into said conduit; and, means adapted for manual operation of said agitating means and said bellows, whereby, a steady flow of powder and air is supplied to said discharge passage for dusting purposes.

6. A garden duster of the class described comprising: a container having a closed lower end and an open upper end; a cover releasably mounted on the open upper end; the upper portion of said container adapted to form a dusting powder storage chamber; the lower end of said storage chamber including a pair of downwardly and inwardly sloping walls; the lower ends of said walls being spaced apart and interconnected by a concavely shaped transverse plate; a plurality of apertures through said plate; a guide means disposed beneath said transverse plate; a regulating means slidably mounted on said guide means and adapted to coact with said transverse plate for regulating the rate of powder flow; an agitating means rockably mounted in said storage chamber adapted to coact with said transverse plate for agitating the dusting powder to prevent it from forming into lumps; a transverse discharge passage in said container immediately below said transverse plate for receiving the dusting powder; an air chamber in said container below said discharge passage; a bellows in said air chamber adapted to form a separating wall in said air chamber and divide it into two portions; a conduit connecting said air chamber portions with said discharge passage; each of said air chamber portions being provided with an air inlet valve and a discharge valve for discharging the air from each air chamber into said conduit; a shaft for rocking said agitating means; a shaft rockably mounted for operating said bellows; and, lever means interconnecting said shafts for simultaneous manual operation of said agitating means and bellows, whereby, a steady flow of powder and air is supplied to said discharge passage for dusting purposes.

7. The invention as set forth in claim 6, wherein said container is provided with means adapted to fit the back of the operator whereby the duster may be carried on his back.

References Cited in the file of this patent

UNITED STATES PATENTS

| | | |
|---|---|---|
| 77,431 | Randolph | Dec. 13, 1904 |
| 1,593,663 | Metzger et al. | July 27, 1926 |
| 2,310,620 | Dye | Feb. 9, 1943 |
| 2,338,096 | Chater | Jan. 4, 1944 |